(12) United States Patent
Dotsch et al.

(10) Patent No.: US 8,802,768 B2
(45) Date of Patent: Aug. 12, 2014

(54) POLYMER COMPOSITION FOR USE IN BLOW MOULDING

(75) Inventors: Diana Dotsch, Mainz (DE); Bernd Lothar Marczinke, Romerberg (DE); Gerhardus Meier, Frankfurt (DE); Maclovio Herrera Salinas, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/112,846

(22) PCT Filed: Apr. 19, 2012

(86) PCT No.: PCT/EP2012/057127
§ 371 (c)(1),
(2), (4) Date: Oct. 18, 2013

(87) PCT Pub. No.: WO2012/143421
PCT Pub. Date: Oct. 26, 2012

(65) Prior Publication Data
US 2014/0045988 A1    Feb. 13, 2014

Related U.S. Application Data

(60) Provisional application No. 61/507,903, filed on Jul. 14, 2011.

(30) Foreign Application Priority Data

Apr. 19, 2011 (EP) .................................... 11003281

(51) Int. Cl.
*C08L 23/08* (2006.01)
*C08L 23/06* (2006.01)
*C08F 2/12* (2006.01)
*C08F 2/34* (2006.01)

(52) U.S. Cl.
USPC ............... 524/528; 525/53; 525/240; 526/65; 526/348.4; 526/348.6; 526/352; 526/905

(58) Field of Classification Search
USPC ............ 524/528; 525/53, 240; 526/65, 348.4, 526/348.6, 352, 905
See application file for complete search history.

(56) References Cited

U.S. PATENT DOCUMENTS

| 7,897,710 B2 * | 3/2011 | Amos et al. ................. 526/348.1 |
| 2013/0075409 A1 * | 3/2013 | Kapur et al. .................. 220/562 |

FOREIGN PATENT DOCUMENTS

| WO | WO0114122 A1 | 3/2001 |
| WO | WO2009148487 A1 | 12/2009 |
| WO | WO2010063445 A1 | 6/2010 |
| WO | WO2011060954 A1 | 5/2011 |

OTHER PUBLICATIONS

PCT International Search Report & Written Opinion mailed May 29, 2012, for PCT/EP2012/057127.

* cited by examiner

*Primary Examiner* — Fred M Teskin

(57) ABSTRACT

A novel polymer composition is described comprising ethylene homopolymers and/or copolymers of ethylene with $C_3$-$C_8$-alpha-olefins which polymer composition has a density of from 0.940 to 0.949 g/cm3, a melt index (HLMI) according to DIN EN ISO 1133:2005, condition G at 190° C. and 21.6 kg, of from 3 to 7 g/10 min. and a Hostalen Long Chain Branching Index (HLCBI) of from 3 to 8, and which polymer composition is produced by polymerisation with one or more Ziegler catalysts in a series of at least two polymerization reactors. The new polymer composition can in particular be used for blow moulding of intermediate bulk containers.

9 Claims, No Drawings

POLYMER COMPOSITION FOR USE IN BLOW MOULDING

This application is the U.S. National Phase of PCT International Application PCT/EP2012/057127, filed Apr. 19, 2012, claiming priority of European Patent Application No. 11003281.0, filed Apr. 19, 2011, and claiming the benefit under 35 U.S.C. 119(e) of U.S. Provisional Application No. 61/507,903, filed Jul. 14, 2011, the contents of which are incorporated herein by reference in their entirety.

FIELD OF THE INVENTION

The present invention relates to a novel polymer composition, a method of manufacturing such polymer composition, the use of such polymer composition for the blow moulding of containers and to containers obtained by such process.

BACKGROUND OF THE INVENTION

For blow moulding applications, PE resins are required in general to combine good processa-bility, high surface quality of the finished article and a good balance of mechanical properties (stiffness, impact resistance, environmental stress crack resistance). Already this is difficult to achieve simultaneously for Ziegler products. Special applications require the polyethylene to fulfil additional properties.

Polymer compositions produced with Ziegler catalysts can be obtained by polymerizations in a series of two or more reactors in which the polymerization is performed under different conditions so that it results at the end in a multimodal polymer composition comprising different polymer fractions with different molecular weight, different molecular weight distribution and different density. Such multimodal polymer compositions can reveal polymer properties which cannot be achieved with a polymerization under constant single polymerization conditions. The manufacture of such multimodal polymer compositions for use in blow moulding of cans and containers obtained by Ziegler catalysis is described e.g. in EP-1228101. Use of a Ziegler catalyst ensures good processing properties of the ensuing polymer, and allows of obtaining good mechanical properties, in particular a good Environmental Stress Cracking Resistance (ESCR). Especially in industry, barrels and containers made from polyethylene materials are often used for packaging and transport of chemicals or other hazardous substances, such PE materials excelling by superior stiffness and stress crack resistance of the respective blow mouldings. When used for intermediate or large containers it is further important that the moulded article shows a good dimensional stability.

Polymer compositions suitable for blow moulding of large containers are often produced with Phillips-type chromium oxide catalysts which are known to display very little warpage, but suffers from very broad molecular weight distribution unsuitable for multimodal product engineering. The so produced polymer compositions show a typical gap swelling behaviour during the blow moulding process which is usually different from polymer compositions produced with Ziegler catalysts, the latter having usually a lower gap swell if compared with chromium catalyst products.

In WO2004/058878 a polyethylene composition is described which is produced in a series of three reactors with a Ziegler catalyst. Such polyethylene composition shows advantageous properties, however, the composition shows during the blow moulding process a swelling be-haviour different from the often applied chromium catalyst polymer products. Such different swelling behaviour can cause problems for the blow moulding operation because the machinery may need adjustments to the deviating swelling behaviour.

SUMMARY OF THE INVENTION

It is an object of the present invention to find new polymer compositions which are suitable for blow moulding of containers, in particular of large containers with a volume between 100 and 2000 l, which can be produced in production plants dedicated for the use of Ziegler catalysts, conferring improved dimensional stability of the moulded article after release from the mould and cooling to ambient temperature and revealing processing properties in blow moulding processes similar to the properties of polymer compositions usually obtained with chromium catalysts.

According to this invention this object is achieved by a polymer composition comprising eth-ylene homopolymers and/or copolymers of ethylene with $C_3$-$C_8$-alpha-olefins which polymer composition has a density of from 0.940 to 0.949 g/cm$^3$, a melt index (HLMI) according to DIN EN ISO 1133:2005, condition G at 190° C. and 21.6 kg, of from 3 to 7 g/10 min. and a Hostalen Long Chain Branching Index (HLCBI) of from 3 to 8, and which polymer composition is produced by polymerization with one or more Ziegler catalysts in a series of at least two polymerization reactors.

DETAILED DESCRIPTION OF THE INVENTION

The Hostalen Long Chain Branching Index (HLCBI) has been found to be a very suitable index for describing the rheological properties of multimodal polymer compositions. It is an index derived from common rheological and molecular weight parameters and is a good representation of the average extent of long chain branching in a polymer composition. The HLCBI is dimensionless index calculated according to the following equation:

$$HLCBI = \left(\frac{M_z}{M_w}\right)\left(\frac{1}{g_{M_z}}\right)(eh_{at\,0.1s^{-1}} - 0.99)$$

where:
$M_z$ and $M_w$ are the $3^{rd}$ and $2^{nd}$ (or weight-average) moment of the molecular weight distribution, as determined by Gel-Permeation Chromatography coupled with Multi-Angle-Laser-Light-Scattering (GPC-MALLS). A more detailed description of the method can be found in the experimental section. For data recording and computation of the $M_z$ and $M_w$ values from the experimentally obtained molecular weight distribution curve, commercial GPC software can be used (for the instant invention obtained from: hs GmbH, Hauptstraβe 36, D-55437 Ober-Hilbersheim).

$g_{M_z}$ is the branching factor at a molecular weight $M=M_z$. The branching factor is defined for each eluted polymer fraction, as the ratio between the root-mean-square (rms) radius of gyration, $\langle R_g^2 \rangle$, and the measured polymer to the rms radius of gyration of a linear PE reference, $\langle R_g^2 \rangle_{linear}$, that is $$g_M = \frac{\langle R_g^2 \rangle_M}{\langle R_g^2 \rangle_{M,linear}}$$

eh is the elongational hardening of the polymer, for the purposes of the present patent at an uniaxial elongation rate of 0.1 s$^{-1}$ (eh indexed 'at 0.1 s$^{-1}$') and at a test temperature of T=150° C. Elongational or strain hardening in uniaxial elongation is the ratio of the maximum melt elongational viscosity measured at the specific elongation rate, $\eta_{E,max}$, over the linear re-sponse at the same time, $\eta_s$. Accordingly, eh is defined as $$eh = \frac{\eta_{E,max}}{\eta_s}$$

The $\eta_{E,max}$, in case no plateau is observed after a certain elongation, can be defined as the maximum polymer melt viscosity value, measured at 10-50 seconds after the start of deformation or at elongations L of the specimen ln(L(t)/L(0))≥3 (based on the definition of 'Hencky strain').

The linear viscoelastic response, $\eta_s$, is calculated from fitting linear rheological data of G' and G" at the same temperature with a multi-mode Maxwell model, calculating the transient shear viscosity and multiplying by 3 (Trouton ratio).—The present method and the definition of elongational (strain) hardening is described in Mackosko C. W. Rheology Principles, Measurements and Applications, 1994, Wiley-VCH, New York.

Elongational flow or rheological properties of polymer melts are paramount to processing op-erations like film blowing, blow moulding and thermoforming Strain or elongational hardening eh induces a so-called self-healing effect which supports a homogenous deformation of the melt. Thus polymers exhibiting strain hardening in elongational flow improve the production of films and bottles or other mouldings with respect to a homogenous distribution of wall thickness. On the other hand, strain or elongational hardening eh is also responsive to molecular properties of the polyethylene composition otherwise poorly measurable by parameters reflecting the weight of the high molecular weight fraction, such as $M_z$, or the degree of long chain branching such as reflected by the branching factor for the high molecular weight tail weight $M_z$. Conventionally, the skilled person was held to believe that eh is positively correlated to and is dominated by $M_z$ and eventually $g_{Mz}$.

Preferably, the polymer composition according to the present invention has a $g_{Mz}$>0.26, more preferably >0.28, most preferably >0.30. Preferably, in combination with any of the foregoing preferred lower limits for $g_{Mz}$, $g_{Mz}$ has preferably a value of less than 0.45, more preferably a value of less than 0.43 and most preferably a value of less than 0.41.

The elongation hardening value eh for the polymer compositions of this invention is preferably >1.0 s$^{-1}$, more preferably the eh value is at least 1.2 s$^{-1}$ and most preferably is at least 1.3 s$^{-1}$.

Preferably, the polymer composition according to the present invention has a $M_z$ of <3,200,000 g/mol, more preferably of <3,000,000 g/mol. The latter most preferred embodiment is particularly preferred in conjunction with the above given, preferred values for $g_{Mz}$, in particular with $g_{Mz}$>0.28, and is preferred especially and preferably in conjunction with an eh value of >1.2 s$^{-1}$. This illustrates further that a decrease in $M_z$ and a lower degree in long chain branching may surprisingly coincide with an increase in elongational viscosity and hence favourable processing properties.

The HLCBI of the polymer compositions of this invention is preferably in the range between 4 and 7.

An further parameter for characterizing the molecular composition of the polymer compositions according to this invention is the Flow Rate Ratio (FRR), i.e. the ratio between the melt flow rate at a load of 21.6 kg and the melt flow rate at a load of 5 kg. For the polymer compositions of this invention the FRR is usually between 15 and 25, preferably between 17 and 23.

The density of the polymer compositions of this invention can vary in a range between 0.940 and 0.949 g/cm$^3$, preferably between 0.943 and 0.949 g/cm$^3$ and most preferably between 0.946 and 0.949 g/cm$^3$.

The polymer compositions of this invention show a very good balance between Environmental Stress Cracking Resistance, density and impact balance. The polymer compositions have preferably an Environmental Stress Cracking Resistance (ESCR) determined by FNCT (80° C./4 MPa) of at least 15 hours and can have FNCT values of more than 30 hours.

A further characteristic of the polymer compositions of this invention is their Attenuated Notch Tensile Strength (atn at −30°). Typical values of this parameter are in the range above 130 kJ/m$^2$, preferably above 150 kJ/m$^2$ and in particular between 160 and 200 kJ/m$^2$.

Since it is one of the objects of this invention to find Ziegler catalyzed polymer compositions with chromium catalyst like processing properties the swell ratio (SR) can represent an im-portant parameter. The measurement of the swell ratio is described in detail in the experi-mental section of this patent. The swell ratio is usually between 150 and 220%, preferably between 150 and 180%.

The polymer compositions of this invention are produced by polymerization with at least one Ziegler catalyst. Usually the same type of Ziegler catalyst is used in the different polymeriza-tion reactors. It is further preferred to obtain the polymer compositions of this invention by using a Ziegler solid catalyst component comprising the product of a process comprising (a) reacting a magnesium alcoholate of formula Mg(OR$_1$)(OR$_2$) compound, in which R$_1$ and R$_2$ are identical or different and are each an alkyl radical having 1 to 10 carbon atoms, with titanium tetrachloride carried out in a hydrocarbon at a temperature of 50-100° C., (b) subjecting the reaction mixture obtained in (a) to a heat treatment at a temperature of 110° C. to 200° C. for a time ranging from 3 to 25 hours (c) isolating and washing with a hydrocarbon the solid obtained in (b), said solid catalyst component having a Cl/Ti molar ratio higher than 2.5

In the preparation of the catalyst component in step (a), R$_1$ and R$_2$ are preferably alkyl groups having from 2 to 10 carbon atoms or a radical —(CH$_2$)$_n$OR$_3$, where R$_3$ is a C$_1$-C$_4$-alkyl radical and n is an integer from 2 to 6. Preferably R$_1$ and R$_2$ are C$_1$-C$_2$-alkyl radical. Examples of such magnesium alkoxides are: magnesium dimethoxide, magnesium diethoxide, magnesium di-1-propoxide, magnesium di-n-propoxide, magnesium di-n-butoxide, magnesium methoxide ethoxide, magnesium ethoxide n-propoxide, magnesium di(2-methyl-1-pentoxide), magnesium di(2-methyl-1-hexoxide), magnesium di(2-methyl-1-heptoxide), magnesium di(2-ethyl-1-pentoxide), magnesium di(2-ethyl-1-hexoxide), magnesium di(2-ethyl-1-heptoxide), magnesium di(2-propyl-1-heptoxide), magnesium di(2-methoxy-1-ethoxide), magnesium di(3-methoxy-1-propoxide), magnesium di(4-methoxy-1-butoxide), magnesium di(6-methoxy-1-hexoxide), magnesium di(2-ethoxy-1-ethoxide), magnesium di(3-ethoxy-1-propoxide), magnesium di(4-ethoxy-1-butoxide), magnesium di(6-ethoxy-1-hexoxide), magnesium dipentoxide, magnesium dihexoxide. Preference is given to using the simple magnesium alkoxides such as magnesium diethoxide, magnesium di-n-propoxide and magnesium di-isobutoxide. Magnesium diethoxide is especially preferred.

The magnesium alkoxide can be used as a suspension or as a gel dispersion in a hydrocarbon medium. Use of the magnesium alkoxide as a gel dispersion constitutes a preferred embodiment. In general, commercially available magnesium alkoxides, in particular $Mg(OC_2H_5)_2$, has average particle diameter ranging from 200 to 1200 μm preferably about 500 to 700 μm. In order to have optimal results in the catalyst preparation it is preferable to substantially reduce its particle size. In order to do so, the magnesium alcoholate is suspended in an inert, saturated hydrocarbon thereby creating a hydrocarbon suspension. The suspension can be subject to high shear stress conditions by means of a high-speed disperser (for example Ultra-Turrax or Dispax, IKA-Maschinenbau Janke & Kunkel GmbH) working under inert atmosphere (Ar or $N_2$). Preferably the shear stress is applied until a gel-like dispersion is obtained. This dispersion differs from a standard suspension in that it is substantially more viscous than the suspension and is gel-like. Compared with the suspended magnesium alcoholate, the dispersed magnesium alcoholate gel settles down much more slowly and to a far lesser extent.

As already explained, in the first step, the magnesium alkoxide is reacted with $TiCl_4$ in an inert medium.

The reaction of the magnesium alkoxide with $TiCl_4$ is carried out at a molar ratio of Ti/Mg higher than 1 and preferably in the range 1.5 to 4, and more preferably in the range of 1.75 to 2.75, at a temperature from 50 to 100° C., preferably from 60 to 90° C. The reaction time in the first stage is 0.5 to 8 hours, preferably 2 to 6 hours.

Suitable inert suspension media for the abovementioned reactions include aliphatic and cycloaliphatic hydrocarbons such as butane, pentane, hexane, heptane, cyclohexane, isooctane and also aromatic hydrocarbons such as benzene and xylene. Petroleum spirit and hydrogenated diesel oil fractions which have carefully been freed of oxygen, sulfur compounds and moisture can also be used.

In a successive step (b) the so obtained reaction mixture containing the product of the reaction between the magnesium alcoholate and the transition metal compound is subject to a thermal treatment at a temperature ranging from 80° C. to 160° C., preferably from 100° C. to 140° C., for a period of time ranging from 3 to 25 hours, preferably from 5 to 15 hours before split-off process of alkyl chloride is complete. At the end of the preparation process the particle size of the catalyst component preferably ranges from 5 to 30 μm and more preferably from 7 to 15 μm.

After step (b) is completed, hydrocarbon washings at temperatures ranging from 60 to 80° C. can be carried out until the supernatant mother liquor has Cl and Ti concentrations of less than 10 mmol/l. As explained the solid obtained at the end of the washing step (c) has usually a Cl/Ti molar ratio of at least 2.5, preferably at least 3 and more preferably ranging from 3 to 5. The solid obtained has the following typical composition: Mg:Ti:Cl=1: (0.8-1.5): (3.2-4.2).

In certain more preferred embodiments, it proved advantageous to carry out a further stage (d), in which the obtained solid is contacted with an aluminum alkyl halide compound in order to obtain a final solid catalyst component in which the Cl/Ti molar ratio is increased with respect to that of the solid before step (d).

The alkylaluminum chloride is preferably selected from the dialkylaluminum monochlorides of the formula $R^3_2AlCl$ or the alkylaluminum sesquichlorides of the formula $R^3_3Al_2Cl_3$ in which $R^3$ can be identical or different alkyl radicals having 1 to 16 carbon atoms. The following may be mentioned as examples: $(C_2H_5)_2AlCl$, $(isobutyl)_2AlCl$ and $(C_2H_5)_3Al_2Cl_3$, (ethylaluminum sesquichloride), this latter being preferred. The reaction can be carried out in a stirred vessel at a temperature of from −0° C. to 150° C., preferably from 30° C. to 100° C. for a time ranging from 0.5 to 5 hours.

The aluminum alkylchloride compound is used in amounts such that the Al/Ti molar ratio (calculated with reference to the Ti content of the solid catalyst component as obtained by the previous step) is from 0.05 to 1, preferably from 0.1 to 0.5.

As explained, this latter reaction generates a final solid catalyst component in which the Cl/Ti molar ratio is increased and generally being at least 3 most preferably higher than 3.5.

By effect of this latter step (d) a certain extent of the titanium atoms may be reduced from oxidation state $Ti^{+4}$ to oxidation state $Ti^{+III}$.

The so obtained catalyst component (A) is preferably used together with an organo aluminum compound (B) in the ethylene polymerization.

The organoaluminum compound (B) is preferably selected from trialkyl aluminum compounds such as for example trimethylaluminum (TMA), triethylaluminum (TEAL), triisobutylaluminum (TIBA), tri-n-butylaluminum, tri n-hexylaluminum, tri-n-octylaluminum, triisoprenylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used in mixture with said trialuminum alkyls. Use of TEAL and TIBA is preferred.

In addition to the above mentioned characteristics the solid catalyst component (A) may show a porosity $P_F$ determined with the mercury method higher than 0.40 cm$^3$/g and more preferably higher than 0.50 cm$^3$/g and usually in the range 0.50-0.80 cm$^3$/g. The total porosity $P_T$ can be in the range of 0.50-1.50 cm$^3$/g, particularly in the range of from 0.60 and 1.20 cm$^3$/g, and the difference $(P_T-P_F)$ can be higher than 0.10 preferably in the range from 0.15-0.50. The surface area measured by the BET method is preferably lower than 80 and in particular ranging between 10 and 70 m$^2$/g. The porosity as measured by the BET method is generally ranging between 0.10 and 0.50, preferably from 0.10 to 0.40 cm$^3$/g.

In fact, a small average particle size, such as less than 30 μm, preferably ranging from 7 to 15 μm, are particularly suited for slurry polymerizations in an inert medium, which can be carried out continuously in stirred tank reactors or in loop reactors. This average particle diameter $d_{50}$ is determined in accordance with DIN 53477 and DIN66144.

The so formed catalyst system can be used directly in the main polymerization process or alternatively, it can be pre-polymerized beforehand.

Suitable catalysts to be used for the production of the polymer compositions of this invention are described in detail in WO2011/015552, the content of which shall be deemed to be incorporated by reference in this patent.

The catalyst preferably used in this invention can be batch pre-polymerization with ethylene and in this case it is preferred that an amount of polymer ranging from 0.5 to 20 g per gram of catalyst component is produced during the pre-polymerization. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process.

The catalyst preferably used in this invention can be used in any kind of polymerization process both in liquid and gas-phase processes. Catalysts having small particle size, (less than 40 μm) are particularly suited for slurry polymerization in an inert medium, which can be carried out continuously stirred tank reactor or in loop reactors. Catalysts having larger particle size are particularly suited for gas-phase polymerization processes which can be carried out in agitated or fluidized bed gas-phase reactors.

The polymer compositions according to this invention can be produced in a reactor cascade comprising at least two polymerization reactors. Such polymerization reactors can be reactors in which the polymerization is performed in suspension, i.e. slurry reactors which can be loop or stirred tank reactors. The reactors can also be gas phase reactors in which the polymerization is performed in the gas phase either in a fluidized bed or in a stirred bed. It is also possible to employ a multi-zone circular reactor in which in the polymerization is performed in the gas phase and the compartment in which the polymer particles are rising and the compartment in which the polymer particles are settling down are exposed to different reaction conditions. All such reactor types are well known to the persons skilled in the art. The reactor cascade can comprise the above-mentioned in all possible sequences. Preferred are embodiments in which the reactor cascade comprises a sequence of three reactors.

According to this invention a preferred sequence of reactors in a reactor cascade is characterized in that the polymerization in the first polymerization reactor is performed in a suspension. Another preferred sequence of reactors in a reactor cascade is characterized in that the polymerization in the last polymerization reactor is performed in a gas phase. The most preferred sequences are a sequence of two or, even more preferred, three stirred tank suspension reactors in series, and a sequence comprising a loop suspension reactor followed by a fluidized bed gas phase reactor.

According to a preferred embodiment of this invention the polymer composition consists essentially of three polymeric weight fractions A, B and C, wherein the fraction with the lowest molecular weight fraction A is a ethylene homopolymer and the fractions with the medium and highest molecular weight fractions B and C, respectively, are copolymers of ethylene and 1-butene and/or 1-hexene as the co-monomer, and the polymer composition consists essentially of from 45 to 55% (w/w), preferably of from 49 to 55% (w/w) of said homopolymer A, of from 24 to 34% (w/w), preferably of from 24 to 28% (w/w) of said copolymer B, of from 15 to 25% (w/w) preferably of from 20 to 24% (w/w) of said copolymer C, and of from 0 to 5% (w/w) of non-polymeric additives and/or polymeric lubricants, based on the total weight of the polymer composition.

According to another preferred embodiment of this invention the polymer composition is produced in a series of three polymerization reactors, wherein the polymerisation is carried out in such a way, that in a first step an ethylene homopolymer A is obtained having a melt index according to DIN EN ISO 1133:2005, condition G, at 190° C. and 21.6 kg, of from 20 to 60 g/10 min, preferably of from 30 to 45 g/10 min and wherein in a second step a copolymer B is produced and the resulting polymer composition has a melt index according to DIN EN ISO 1133:2005, condition G, at 190° C. and 21.6 kg, of from 4 to 10 g/10 min, preferably of from 4 to 8 g/10 min, and wherein in a third step copolymer C is produced and the resulting polymer composition has a melt index according to DIN EN ISO 1133:2005, condition G, at 190° C. and 21.6 kg, of from 3 to 7 g/10 min, preferably of from 3 to 6 g/10 min.

The following examples are given in order to further illustrate the present invention by way of example

EXAMPLES

If not otherwise indicated, all synthesis and polymerizations were carried out in an argon atmosphere. All suspending agents were washed by argon and dried through molecular sieves before being used.

Density was determined according to DIN EN ISO 1183-1:2004, Method A (Immersion) with compression moulded plaques of 2 mm thickness. The compression moulded plaques were prepared with a defined thermal history: Pressed at 180° C., 20MPa for 8 min with subsequent crystallization in boiling water for 30 min.

The melt flow rate $MFR_{21.6}$ was determined according to DIN EN ISO 1133:2005, condition G at a temperature of 190° C. under a load of 21.6 kg.

The melt flow rate $MFR_5$ was determined according to DIN EN ISO 1133:2005, condition T at a temperature of 190° C. under a load of 5 kg.

The Flow Rate Ratio FRR is the ratio of $MFR_{21.6}/MFR_5$

The swell ratio SR was measured in a high-pressure capillary rheometer (Rheotester 1000, Göttfert Werkstoff-Prüfmaschinen GmbH, Buchen, Germany) at a shear rate of 1440 1/s in a 30/2/2/20 round-perforation die with conical inlet (angle=20°, D=2 mm, L=2 mm, total length=30 mm) at a temperature of 190° C., using a laser-diode placed at a distance of 78 mm from the die exit. SR is defined as difference $d_{max}-d_d$ divided by $d_d$ with $d_{max}$ being the maximum diameter of the strand and $d_d$ being the diameter of the die.

The Environmental Stress Cracking Resistance was determined by FNCT, measured according to the method of Fleissner in Igepal solution (or an differently branded analogue of Igepal), was determined on compression moulded specimens made from the polyethylene samples.

The recording of the GPC (Gel Permeation Chromatography) curves was carried out by high-temperature gel permeation chromatography using a method described in ISO 16014-1:2003(E) and ISO 16014-4:2003(E): solvent 1,2,4-trichlorobenzene (TCB), temperature of apparatus and solutions 135° C. and as concentration detector a PolymerChar (Valencia, Pa-terna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series was used. The solvent was vacuum distilled under nitrogen and was stabilized with 0.025 wt.-% of 2,6-di-tert-butyl-4-methylphenol. The flow rate used was 1 mL/min, the injection was 400 μL and polymer con-centration was in the range of 0.01 wt. %<conc.<0.05 wt.-%. The molecular weight calibration was established by using monodisperse polystyrene (PS) standards from Polymer Laboratories (now Varian Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method according to ISO 16014-2:2003(E). The Mark-Houwing parameters used were for PS: kPS=0.000121 dL/g, αPS=0.706 and for PE kPE=0.000406 dL/g, αPE=0.725, valid in TCB at 135° C. Data recording, calibration and calculation was carried out using NTGPC_Control_V6.3.00 and NTGPC_V6.4.05 (hs GmbH, Hauptstraβe 36, D-55437 Ober-Hilbersheim), respectively.

Data indicating the elemental composition of the catalysts described reported in the specification were obtained by the following analytical methods:

Ti: photometrically via the peroxide complex

Mg, Cl: titrimetrically by customary methods

Elongational rheology measurements were performed on a Physica MCR 301 parallel plate rheometer instrument from AntonPaar GmbH (Graz, Austria), equipped with the Sentmanant Elongational Rheology tool (SER). The measurements were performed at 150° C., after an an-nealing time of 5 min at the measurement temperature. The measurements were repeated for different specimens of each sample at elongational rates varying between 0.01 s-1 and 10 s-1, typically at 0.01, 0.05, 0.1, 0.5, 1, 5, 10 s-1. For each measurement, the uniaxial elongational melt viscosity was recorded as a function of time.

The test specimens for measurement were prepared as follows: 2.2 g of the resin material were used to fill a moulding plate of 70×40×1 mm. The plate was placed in a press and heated up to 200° C., for 1 min, under a pressure of 20-30 bar. After the temperature of 200° C. was reached, the sample was pressed at 100 bar for 4 min. After the end of the compression-time, the material was cooled down to room temperature and the plate was removed from the form. from the compressed 1 mm thick compressed polymer plate, rectangular films of 12×11×1 mm were cut off and used as specimens for measuring the elongational hardening.

The experimentally determined branching factor g which allows to determine long-chain branches at molecular weight Mz, was measured by Gel Permeation Chromatography (GPC) coupled with Multi-Angle Laser-Light Scattering (MALLS), as described in the following:

The parameter g is the ratio of the measured mean square radius of gyration to that of a linear polymer having the same molecular weight. It is a measure for the presence of long chain branches (LCB) as was shown by the theoretical considerations of Zimm and Stockmeyer (Zimm et al., J. Chem. Phys. 1949, 17, 1301-1314), though there is some mismatch between the experimentally measured branching factor g (sometimes written g', for distinction) and the theoretically deduced one, as described in Graessley, W, Acc. Chem. Res. 1977, 332-339. In the present context, the branching factor g(Mz) is the experimentally determined one.

Linear molecules show a g factor value of 1, while values less than 1 in theory indicate the presence of LCB. Values of g were calculated as a function of molecular weight, M, from the equation:

$$g(M) = <R_g^2>_{sample,M} / <R_g^2>_{linear\ ref,M}$$

where $<R_g^2>_M$ is the mean-square radius of gyration for the fraction of molecular weight M. The linear reference baseline is computed based on the theoretical value of the Zimm-Stockmeyer equation (Zimm et al., J. Chem. Phys. 1949, 17, 1301-1314) for a perfectly linear polymer. The radius of gyration (size of polymers at each fraction coming from GPC) was measured with a Laser (16-angle Wyatt green-laser): for each fraction eluted from the GPC, carried out as described above, the molecular weight M and the branching factor g were de-termined, in order to define g at a defined M.

A Polymer Laboratories (now Varian, Inc., Essex Road, Church Stretton, Shropshire, SY6 6AX,UK) type 210 high temperature GPC was used, with solvent 1,2,4-trichlorobenzene at 135° C. and at a flow rate of 0.6 mL min-1 employing three Shodex UT 806 and one UT 807 columns. Polyethylene (PE) solutions with concentrations of 1 to 5 mg/10 mL, depending on samples, were prepared at 150° C. for 2-4 h before being transferred to the SEC injection vials sitting in a carousel heated at 135° C. The polymer concentration was determined by infrared detection with a PolymerChar IR4 detector as in section b.1 above and the light scattering was measured with a Wyatt Dawn EOS multi angle MALLS detector (Wyatt Technology, Santa Barbara, Calif./U.S.A.). A laser source of 120 mW of wavelength 658 nm was used. The specific index of refraction was taken as 0.104 ml/g. Data evaluation was done with ASTRA 4.7.3 and CORONA 1.4 software (Wyatt, supra). The absolute molecular weight M and radius of gyration $<R_g^2>$ where established by Debye-type extrapolation at each elution volume by means of the afore mentioned software. The ratio g(M) at a given molecular weight M was then calculated from the radius of gyration of the sample to be tested and the radius of the linear reference at the same molecular weight. In the present context, the branching factor g(Mz) means g being determined at M=Mz.

GPC-MALLS measurements for determination of Mz were carried out on a PL-GPC C210 instrument on high temperature GPC of Polyethylene under the following conditions: styrene-divinylbenzene column, 1,2,4-trichlorobenzene (TCB) as solvent, flow rate of 0.6 ml/min., at 135° C., with detection by multi-angle-laser light-scattering (MALLS) detector as described above.

Example 1 a) Preparation of the Catalyst Component A

A suspension of 4.0 kg (=35 mol) of commercial available $Mg(OC_2H_5)_2$ in 25 dm$^3$ of diesel oil having a boiling range from 140 to 170° C. (hydrogenated petroleum fraction) have been treated in a high speed disperser (Krupp Supraton™ type 5200) at 120° C. for a period of 12 hours thus forming a gel-like dispersion. This $Mg(OC_2H_5)_2$-dispersion was transferred to a 130 dm$^3$ reactor equipped with an impeller stirrer and baffles and which already contained 19 dm$^3$ of diesel oil. After rinsing with 5 dm$^3$ of diesel oil 7.6 dm$^3$ (=70 mol) of $TiCl_4$, diluted to 10 dm$^3$ with diesel oil, were then added at 70° C. over a period of 6 hours at a stirring speed of 80 rpm. Afterwards the mixture was heated at T=120° C. for 5 hours. 50 dm$^3$ of diesel oil having a boiling range from 140 to 170° C. (hydrogenated petroleum fraction) were then added and the mixture was cooled to T=65° C. After the solid had settled, the supernatant liquid phase (mother liquor) was then decanted off to a residual volume of 50 dm$^3$. 50 dm$^3$ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm$^3$. This washing procedure was repeated until the titanium concentration of the mother liquor was less than 10 mmol/dm$^3$.

The suspension was then cooled to room temperature. The titanium content was 0.22 g catalyst/mmol Ti and the molar ratio of the solid (catalyst component A) was:

Mg:Ti:Cl≈1:1.34:3.81.

Now, in a further step (corresponding to step d) in the description), the Catalyst component A was pre-activated with Aluminium-sesquichloride (EASC) in a further 'washing' step. The molar Al/Ti-ratio was 0.25:1. The reaction was performed at 85° C. for a time-period of 2 hours.

The titanium content was 0.22 g catalyst/mmol Ti and the molar ratio of the solid (catalyst component A) was:

Mg:Ti:Cl≈1:1.40:4.38.

Example 1(b)

Manufacture of a Polymer Composition Typical for Intermediate Bulk Containers (IBC)

The reactor system was a reactor train of three consecutive stirred tank slurry reactors R1,R2,R3, operated in a continuous mode at the process settings as indicated, with continuous discharge from one reactor into the next one and continuous removal of product from the last reactor. The specific polymerization activity of the catalyst prepared using the catalyst from the preceding step 1(a) in the reactor system was found to be 18 to 23 kg PE/g catalyst. All reactors were operated as suspension reactors under stirring, comprising anhydrous hexane as suspending liquid for the catalyst composition. Monomers were fed as a gas stream comprising further precisely dosed amount of hydrogen as a mass regulator as indicated.

The polymerization was carried out by adding first triethylaluminum as co-catalyst and subsequently adding the preactivated catalyst prepared as described above in section 1(a), as a suspension diluted with diesel oil, into the reactor.

Ethylene was polymerized by feeding an amount of 23 mmol/h of a Ziegler preactivated catalyst component as specified in experimental section 1(a) above into the first reactor together with 120 mmol/h triethylaluminum-alkyl (TEA), as well as sufficient amounts of diluent (hexane), ethylene and hydrogen. The concentrations of ethylene, 1-butene and hydrogen were adjusted to the volume-%-values shown in table I, the remaining volume was a mix of nitrogen and vaporized diluent. Temperature and pressure in the reactor are shown in table I.

The slurry from the first reactor was then transferred into a second reactor, in which the percentage proportion of hydrogen in the gas phase had been reduced and 1-butene is added. The detailed reactor conditions for reactor R2 are shown in table I.

The slurry from the second reactor was then transferred to the third reactor, in which the percentage proportion of hydrogen in the gas phase was increased again The detailed reactor conditions for reactor R3 are shown in table I.

Finally, the diluent was removed from the polymer slurry leaving the third reactor, and the polymer was dried and then pelletized.

TABLE I

|  | unit | R1 | R2 | R3 |
|---|---|---|---|---|
| Temperature | °C. | 80 | 84 | 85 |
| Internal Pressure | bar | 4.8 | 1.5 | 2.4 |
| Ethylene reactor split | % | 54 | 25 | 21 |
| Ethylene | Vol. % | 37 | 71 | 72 |
| Hydrogen | Vol. % | 44 | 1.7 | 15 |
| 1-Butene | Vol. % | 0 | 4.2 | 1.6 |
| P(Ethylene) | bar | 1.6 | 0.55 | 1.2 |
| HLMI 21.6 kg | g/10 min | 39.4 | 5.9 | 4.2 |

Example 2

Another polymer composition was prepared using the same catalyst preparation as described in Example 1(a), but under slightly different reactor conditions as shown in the following table II:

TABLE II

|  | unit | R1 | R2 | R3 |
|---|---|---|---|---|
| Temperature | °C. | 80 | 84 | 85 |
| Internal Pressure | bar | 4.0 | 1.8 | 3.4 |
| Ethylene reactor split | % | 50 | 27 | 23 |
| Ethylene | Vol. % | 38 | 71 | 77 |
| Hydrogen | Vol. % | 43 | 3.9 | 22 |
| 1-Butene | Vol. % | 0 | 3.5 | 1.3 |
| P(Ethylene) | bar | 1.6 | 0.8 | 1.8 |
| HLMI 21.6 kg | g/10 min | 36.9 | 5.8 | 5.7 |

The properties of the products obtained according to Example 1 and Example 2 after pelletization are displayed in table III below.

TABLE III

|  | Example 1 | Example 2 |
|---|---|---|
| Ethylene Split per Reactor R1, R2, R3 [%] | 54/25/21 | 50/27/23 |
| MFR 21.6 kg [g/10'] | 3.5 | 4.4 |
| Density [g/cc] | 0.947 | 0.948 |
| Swell Ratio [%] | 146 | 163 |
| FNCT 4 MPa/80° C. [h] | 28.4 | 15.1 |
| Atn −30° C. [kJ/m$^2$] | 192 | 173 |
| $M_w$ [g/mol] | 593000 | 536000 |
| $M_z$ [g/mol] | 247000 | 270000 |
| $M_z/M_w$ | 4.2 | 5.0 |
| $G(M_z)$ | 0.4 | 0.3 |
| $1 - g(M_z)$ | 0.6 | 0.7 |
| Elongation hardening (eh) at 0.1 s$^{-1}$ | 1.3 | 1.5 |
| HLCBI | 4 | 7 |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A polymer composition comprising:
    an ethylene homopolymer and/or a copolymer of ethylene and a $C_3$-$C_8$-alpha-olefin wherein the polymer composition has:
    (i) a density of from 0.940 to 0.949 g/cm$^3$,
    (ii) a high load melt index from 3 to 7 g/10 min, as measured according to DIN EN ISO 1133:2005, condition G at 190° C. and 21.6 kg, and
    (iii) a Hostalen Long Chain Branching Index (HLCBI) from 3 to 8.

2. The polymer composition of claim 1, wherein the polymer composition has a density from 0.943 to 0.949 g/cm$^3$.

3. The polymer composition of claim 1, wherein the polymer composition has a density from 0.946 to 0.949 g/cm$^3$.

4. The polymer composition of claim 1, wherein the polymer composition has an Environmental Stress Cracking Resistance of at least 15 hours.

5. The polymer composition of claim 1, wherein the polymer composition is produced in the presence of one or more Ziegler catalysts in a series of three polymerization reactors.

6. The polymer composition of claim 1, wherein the polymer composition comprises:
    (A) 45 to 55 wt. %, based on the total weight of the polymer composition, of polymer A, wherein polymer A comprises an ethylene homopolymer;

(B) 24 to 34 wt. %, based on the total weight of the polymer composition, of copolymer B, wherein copolymer B comprises ethylene derived units and butene-1 and/or hexene-1 derived units;

(C) 15 to 25 wt. % based on the total weight of the polymer composition, of copolymer C, wherein copolymer C comprises ethylene derived units and butene-1 and/or hexene-1 derived units; and (D) 0 to 5 wt. %, based on the total weight of the polymer composition, of non-polymeric additives and/or polymeric lubricants;

wherein polymer A has a molecular weight that is lower than the molecular weight of copolymer B, wherein copolymer B has a molecular weight that is lower than the molecular weight of copolymer C.

7. The polymer composition of claim 6, wherein:

polymer A has a melt index from 20 to 60 g/10 min, as measured according to DIN EN ISO 1133:2005, condition G, at 190° C. and 21.6 kg;

copolymer B has a melt index from 4 to 10 g/10 min, as measured according to DIN EN ISO 1133:2005, condition G, at 190° C. and 21.6 kg; and copolymer C has a melt index from 3 to 7 g/10 min, as measured according to DIN EN ISO 1133:2005, condition G, at 190° C. and 21.6 kg.

8. A method for producing a polymer composition comprising:

(A) polymerizing a first reaction mixture comprising ethylene in a first reactor to produce a polymer A, wherein the reaction mixture is in the form of a suspension, wherein the polymer composition comprises:

polymer A, wherein polymer A is an ethylene homopolymer and/or a copolymer of ethylene and a $C_3$-$C_8$-alpha-olefin, and wherein the polymer composition has:

(i) a density of from 0.940 to 0.949 g/cm$^3$, (ii) a high load melt index from 3 to 7 g/10 min, as measured according to DIN EN ISO 1133:2005, condition G at 190° C. and 21.6 kg, and (iii) a Hostalen Long Chain Branching Index (HLCBI) from 3 to 8.

9. The method of claim 8, comprising:

(B) polymerizing a second reaction mixture comprising ethylene, in the first reactor to produce copolymer B, wherein the second reaction mixture is in the form of a suspension; and, (C) polymerizing a third reaction mixture comprising ethylene, in a second reactor to produce copolymer C, wherein the step of polymerizing the third reaction mixture is performed in a gas phase.

* * * * *